(12) United States Patent
Nobukuni (10) Patent No.: US 10,374,339 B2
(45) Date of Patent: Aug. 6, 2019

(54) BATTERY TERMINAL

(71) Applicant: Sumitomo Wiring Systems, Ltd., Yokkaichi, Mie (JP)

(72) Inventor: Takashi Nobukuni, Mie (JP)

(73) Assignee: Sumitomo Wiring Systems, Ltd. (JP)

( * ) Notice: Subject to any disclaimer, the term of this patent is extended or adjusted under 35 U.S.C. 154(b) by 0 days.

(21) Appl. No.: 15/984,734

(22) Filed: May 21, 2018

(65) Prior Publication Data

US 2018/0342819 A1 Nov. 29, 2018

(30) Foreign Application Priority Data

May 24, 2017 (JP) ................................. 2017-102457

(51) Int. Cl.
*H01M 2/30* (2006.01)
*H01R 11/28* (2006.01)

(52) U.S. Cl.
CPC .......... *H01R 11/281* (2013.01); *H01M 2/307* (2013.01); *H01R 11/283* (2013.01); *H01M 2220/20* (2013.01)

(58) Field of Classification Search
CPC .............................. H01R 11/281; H01M 2/307
USPC ......................................... 439/765, 764, 762
See application file for complete search history.

(56) References Cited

U.S. PATENT DOCUMENTS

| | | | | |
|---|---|---|---|---|
| 4,747,793 A | * | 5/1988 | Fukuda | H01R 11/287 439/754 |
| 5,021,013 A | * | 6/1991 | Wiesler | H01R 11/289 439/754 |
| 5,492,780 A | * | 2/1996 | Okada | H01R 11/283 429/121 |
| 5,836,574 A | * | 11/1998 | Park | B25B 5/104 269/93 |
| 10,056,599 B2 | * | 8/2018 | Kato | H01R 11/283 |
| 2016/0254518 A1 | * | 9/2016 | Kato | H01R 11/283 429/122 |
| 2017/0125781 A1 | * | 5/2017 | Tsukiyoshi | H01M 2/30 |
| 2017/0214029 A1 | * | 7/2017 | Tsukiyoshi | H01M 2/30 |
| 2017/0229686 A1 | * | 8/2017 | Takasu | H01M 10/658 |

FOREIGN PATENT DOCUMENTS

| | | |
|---|---|---|
| JP | 2016-167407 | 9/2016 |
| JP | 2016167407 A * | 9/2016 |

* cited by examiner

*Primary Examiner* — Abdullah A Riyami
*Assistant Examiner* — Nader J Alhawamdeh
(74) *Attorney, Agent, or Firm* — Gerald E. Hespos; Michael J. Porco; Matthew T. Hespos (57) ABSTRACT

A battery terminal (1) includes a body (10) with C-shaped upper and lower plate mounting portions (21, 41). First and second fastening portion (60, 70) have bolt accommodating portions (65, 75) respectively. A fastening member (80) is assembled with the first and second fastening portions (60, 70) and is configured to reduce the diameters of the upper and lower plate mounting portions (21, 41). The fastening member (80) includes a fastening bolt (81) having a head (82), a column (83) extending from the head (82) and a shaft (84) extending from the column (83). The column (83) is accommodated into the bolt accommodating portions (65, 75), and a nut (85) is screwed onto the shaft (84). The shaft (84) is insertable through the bolt insertion hole (87) of a washer (86), but the column (83) is not insertable through the bolt insertion hole (87).

6 Claims, 11 Drawing Sheets

BATTERY TERMINAL

BACKGROUND

Field of the Invention

This specification relates to a battery terminal.

Description of the Related Art

Japanese Unexamined Patent Publication No. 2016-167407 discloses battery terminal to be mounted on a battery post of a battery provided in a vehicle. The battery terminal includes a terminal body and a bolt/nut combination for fastening the terminal body to the battery post.

The battery body is formed by bending one metal plate and includes two C-shaped annular portions and two U-shaped bolt holding portions for coupling both ends of the two C-shaped annular portions. The battery post is inserted into the annular portions. The bolt then is inserted through the bolt holding portions and the nut is screwed onto the bolt. Thus, the two bolt holding portions move toward each other, and the annular portions are reduced in diameter to be fixed to the battery post.

The terminal body of the above described battery terminal may be deformed excessively if an excessive tightening torque is applied to the nut.

SUMMARY

A battery terminal disclosed by this specification is to be mounted on a battery post of a battery and includes a terminal body with arcuate first and second mounting portions arranged to face each other and to surround the battery post. A first fastening portion couples one end part of the arcuate first mounting portion and one end part of the arcuate second mounting portion, and a second fastening portion couples the other end part of the arcuate second mounting portion and the other end part of the arcuate second mounting portion. The first and second fastening portions include bolt accommodating portions. A fastening member is assembled with the first and second fastening portions. The fastening member is configured to press the first and second fastening portions toward each other and to reduce the diameters of the first and second mounting portions. The fastening member includes a fastening bolt with a head, and a column extends from the head. An externally threaded shaft extends from the column and defines a cylinder that is thinner than the column. The column is accommodated into the bolt accommodating portions, and a nut is screwed onto the shaft. A sandwiching member has a bolt insertion hole that is dimensioned to receive the shaft. However, the column is not insertable through the bolt insertion hole. The sandwiching portion is configured to sandwich the first and second fastening portions between the sandwiching member and the head by inserting the shaft through the bolt insertion hole and assembling the sandwiching member between the column and the nut.

As described above, the fastening bolt includes the column. The shaft is insertable through the bolt insertion hole of the sandwiching member, but the column is not insertable therethrough. Thus, when the sandwiching member comes into contact with the column, the nut cannot be tightened onto the fastening bolt any farther. Thus, a length of the column determines an appropriate tightening amount. The nut cannot be tightened excessively, and the terminal body is not deformed extensively.

The column may be a polygonal column having side surfaces, and the first and second fastening portions may include a first rotation stopping portion configured to restrict the rotation of the column by contacting one of the side surfaces of the column. According to this configuration, the fastening bolt will not rotate by being dragged by the rotation of the nut, and the fastening bolt can be assembled in a proper posture with the terminal body.

The head may have a polygonal outer shape with plural sides. At least one of the upper and lower plate mounting portions may include a second rotation stopping portion configured to restrict rotation of the head by contacting one of the sides of the head. According to this configuration, the fastening bolt will not rotate by being dragged by the rotation of the nut, and the fastening bolt can be assembled in a proper posture with the terminal body.

The sandwiching member may have a polygonal outer shape with plural sides. At least one of the upper and lower plate mounting portions may include a third rotation stopping portion configured to restrict the rotation of the sandwiching member by contacting one of the sides of the sandwiching member. According to this configuration, the sandwiching member will not rotate by being dragged by the rotation of the nut, and the sandwiching member can be assembled in a proper posture with the terminal body.

Accordingly, a tightening amount of the nut can on the battery terminal can be managed.

DETAILED DESCRIPTION

An embodiment is described with reference to FIGS. 1 to 16. A battery terminal 1 of this embodiment is mounted on a cylindrical battery post 100 provided on a battery (not shown) of a vehicle.

Figure 1:
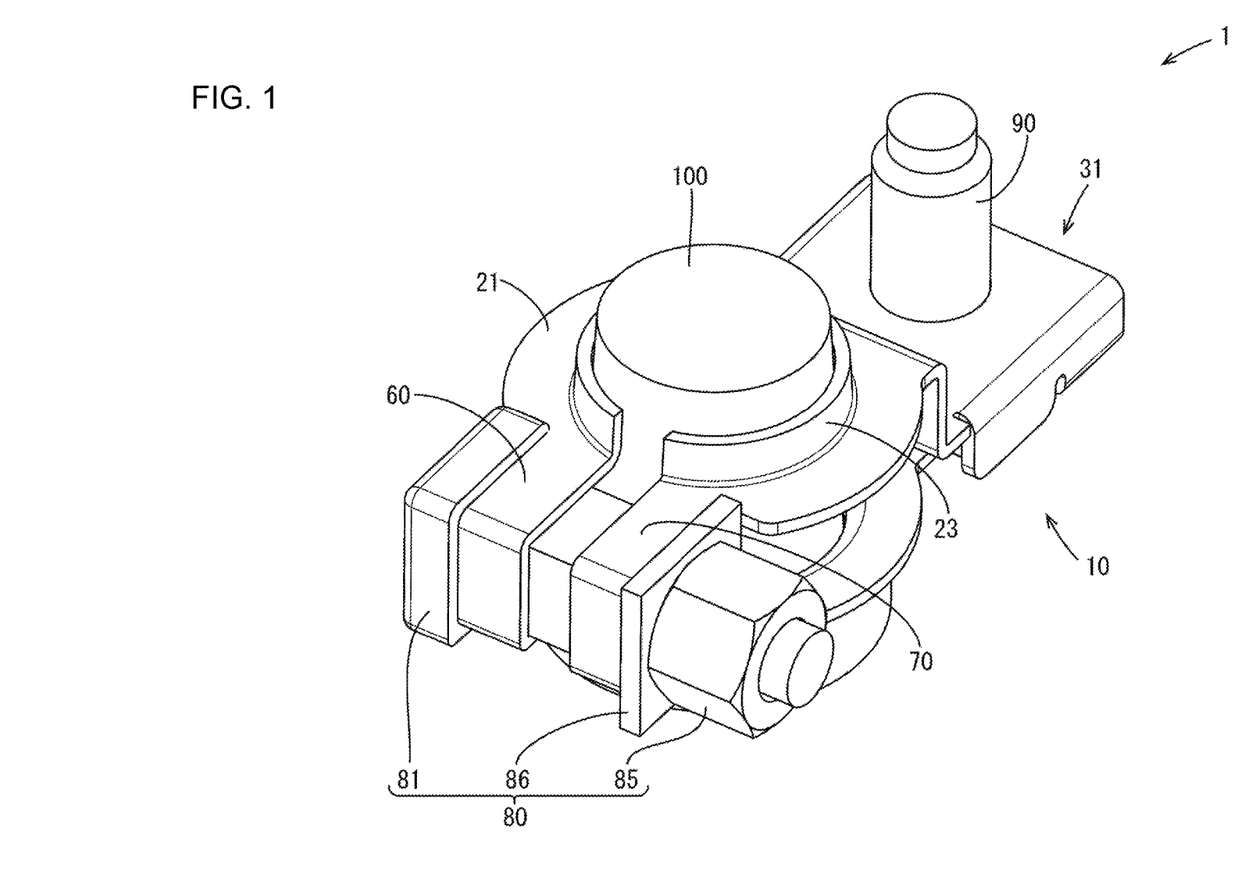
FIG. 1 is a perspective view of a battery terminal of an embodiment.
Figure 2:
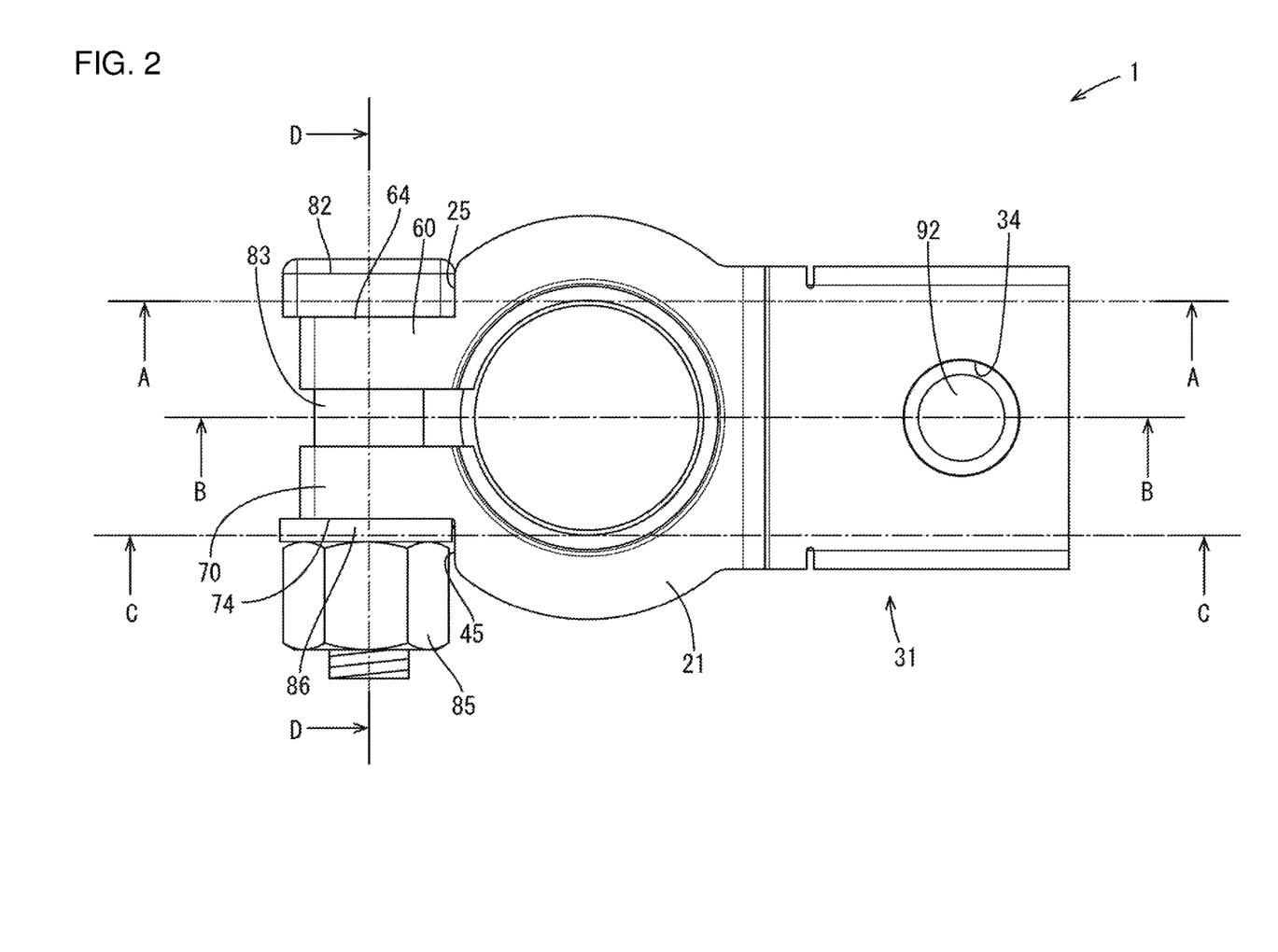
FIG. 2 is a plan view of the battery terminal of the embodiment.

As shown in FIG. 1, the battery terminal 1 includes a terminal body 10, a terminal connecting bolt 90 and a fastening member 80.

Figure 10:
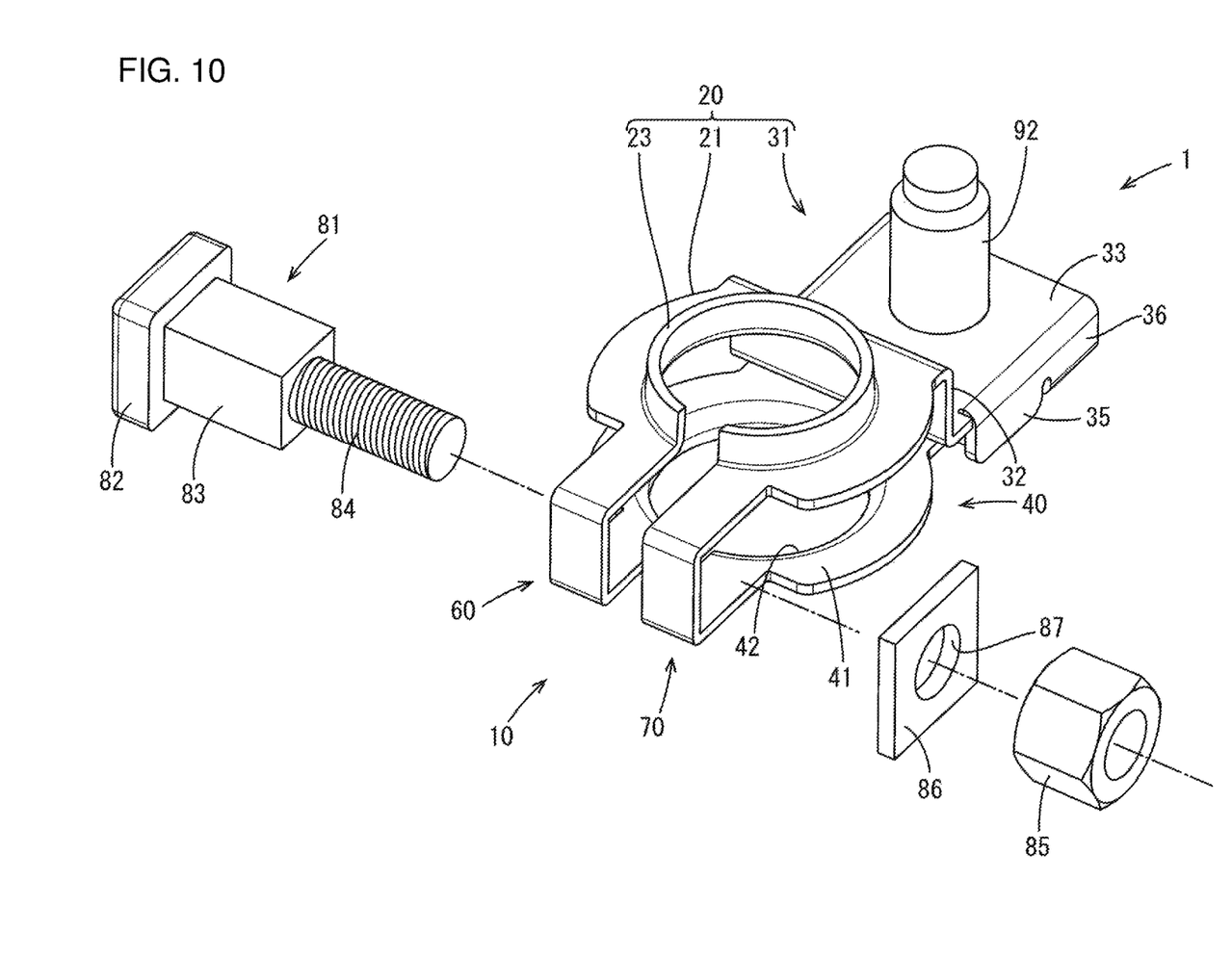
FIG. 10 is an exploded perspective view of the battery terminal of the embodiment.
Figure 11:
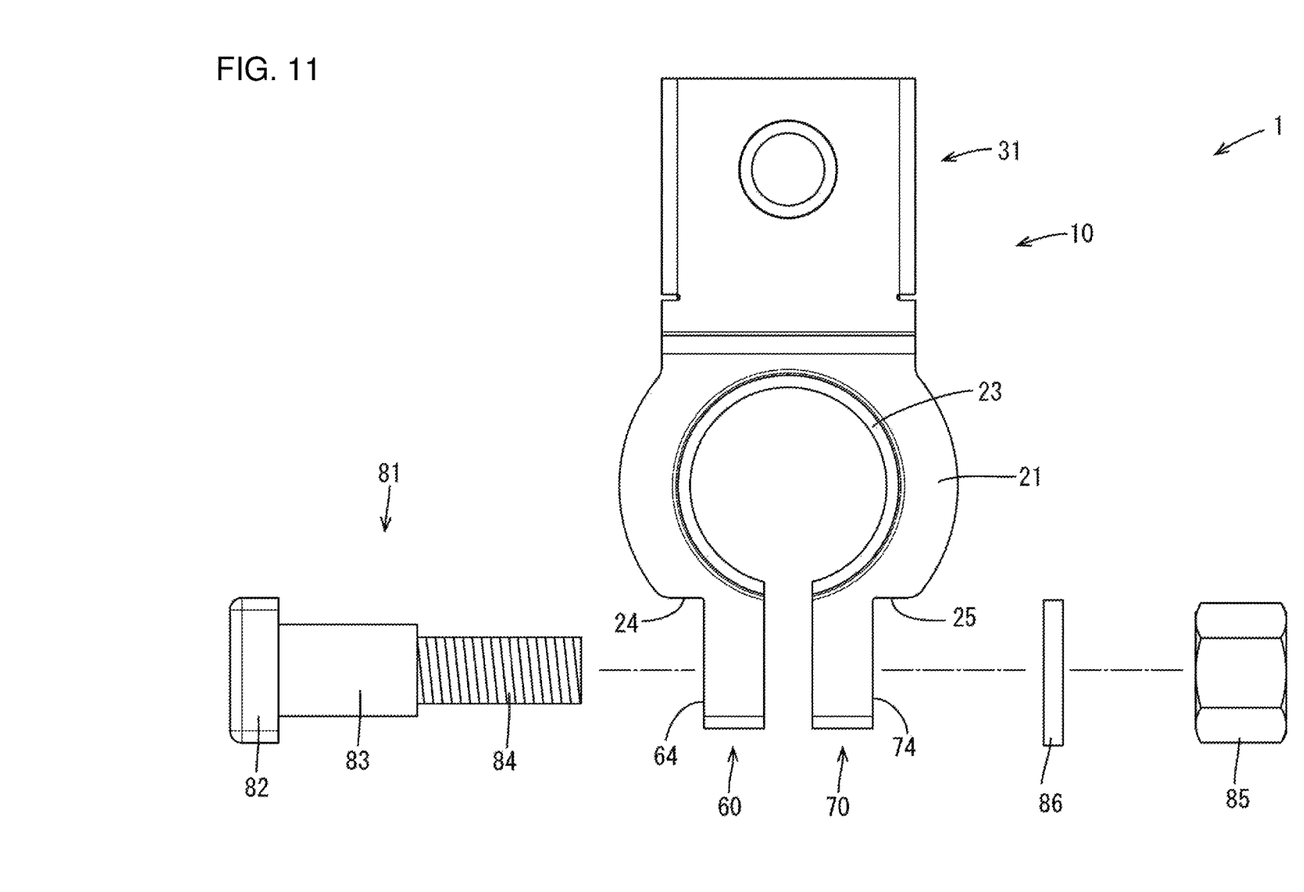
FIG. 11 is an exploded plan view of the battery terminal of the embodiment.

The terminal body 10 is a member formed by stamping and bending one metal plate material and includes an upper plate portion 20, a lower plate portion 40 and two fastening portions 60, 70 coupling the upper plate portion 20 and the lower plate portion 40 (see FIG. 10).

Figure 12:
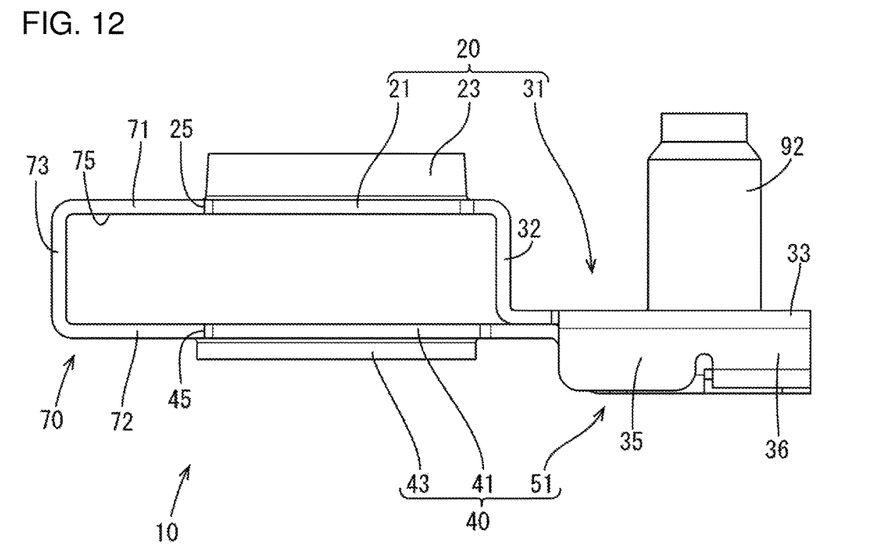
FIG. 12 is a right side view of a terminal body of the embodiment.

As shown in FIG. 12, the upper plate portion 20 includes an upper plate mounting portion 21, an upper plate mounting tube portion 23 and an upper plate connecting portion 31.

Figure 14:
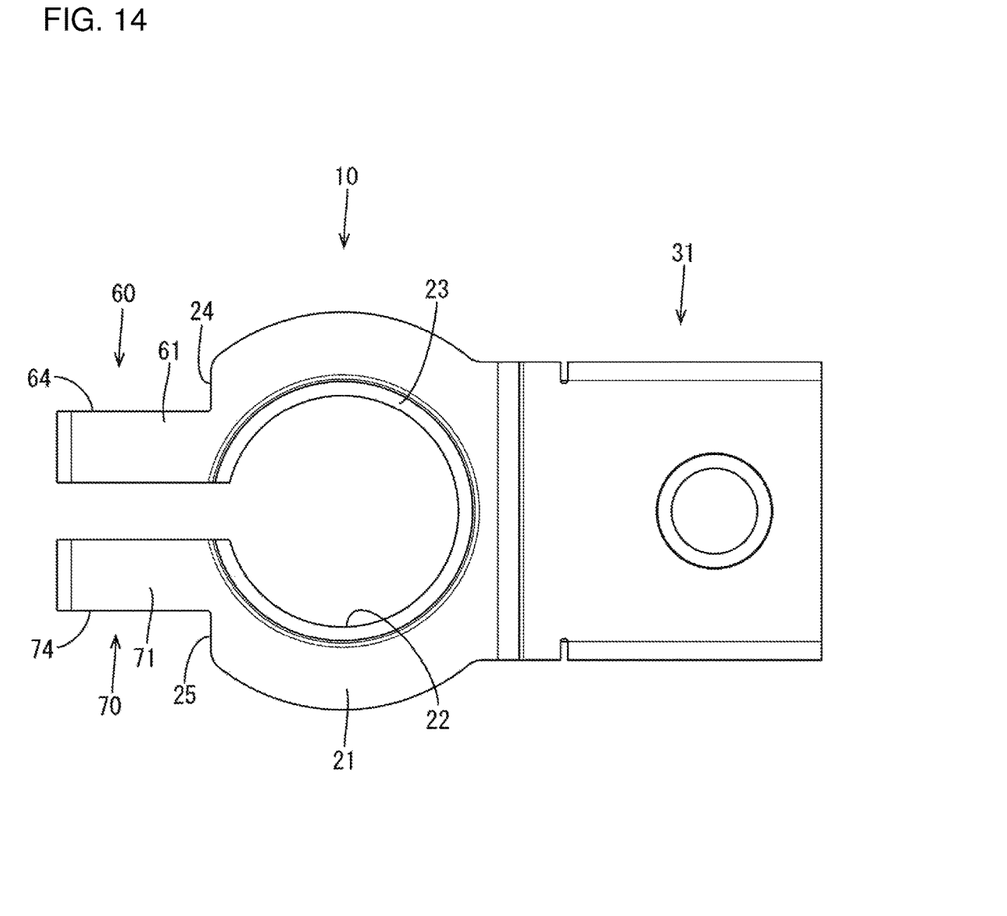
FIG. 14 is a plan view of the terminal body of the embodiment.

The upper plate mounting portion 21 is an arcuate part for surrounding the battery post 100. Specifically, as shown in FIGS. 10 and 14, the upper plate mounting portion 21 is a C-shaped plate-like part having a cut extending from a hole edge to an outer peripheral edge at one position of a ring having a hole in a center as a whole. The center hole is an upper plate mounting hole 22 into which the battery terminal 100 is inserted. The upper plate mounting hole 22 has an inner diameter slightly larger than an outer diameter of the battery post 100 in a free state where the battery terminal 1 is not mounted on the battery post 100.

Figure 4:
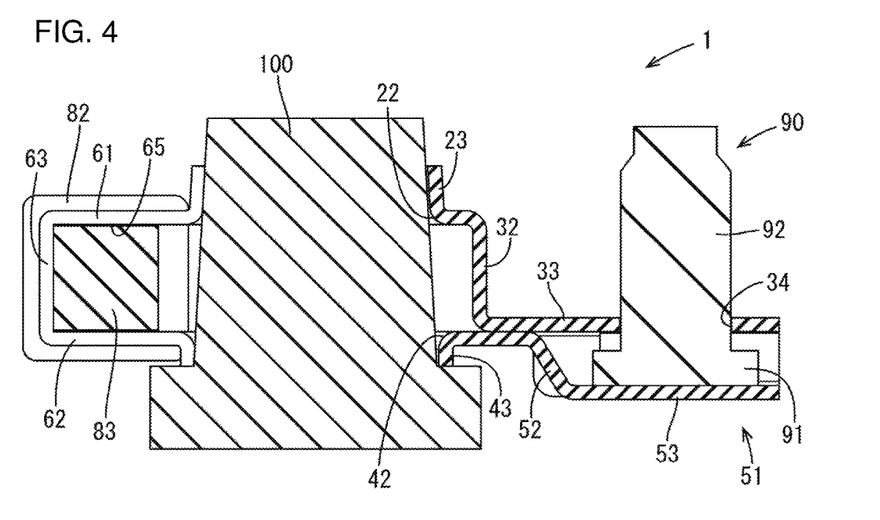
FIG. 4 is a section along B-B of FIG. 2.

As shown in FIGS. 4 and 10, the upper plate mounting tube portion 23 is a C-shaped tubular part rising from the hole edge of the upper plate mounting hole 22 and configured to surround the battery post 100.

Figure 13:
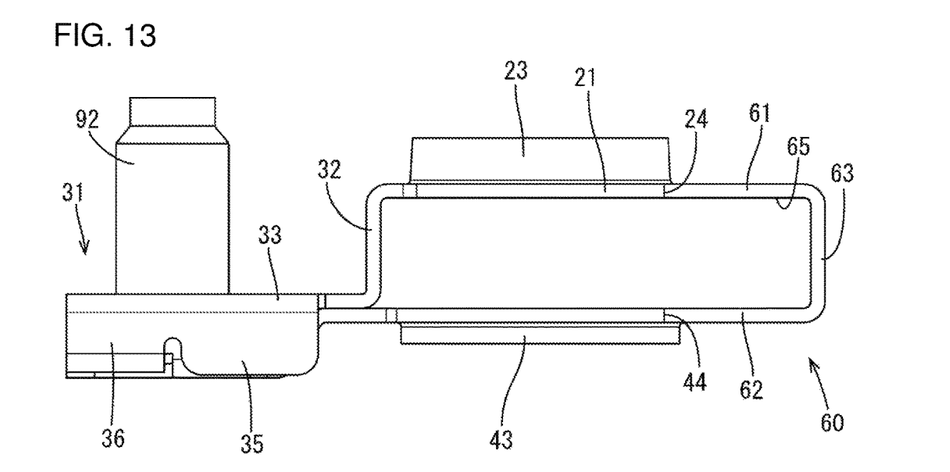
FIG. 13 is a left side view of the terminal body of the embodiment.

As shown in FIGS. 10, 12 and 13, the upper plate connecting portion 31 is a substantially L-shaped part extending from the upper plate mounting portion 21 and includes a stepped wall portion 32, a bolt covering portion 33, two outer wall portions 35 and two fixing plates 36.

The stepped wall portion 32 is a short plate-like part vertically extending from the upper plate mounting portion 21. The bolt covering portion 33 is a rectangular plate-like part extending from an extending end of the stepped wall portion 32 toward a side opposite to the upper plate mounting portion 21. As shown in FIG. 4, the bolt covering portion 33 includes a bolt insertion hole 34 through which a shaft portion 92 of the terminal connecting bolt 90 is inserted.

Each of the two outer wall portions 35 is arranged on each of two side edges (two end edges perpendicular to an end edge connected to the stepped wall portion 32) of the bolt covering portion 33. Each of the two fixing plates 36 is arranged on each of the two side edges of the bolt covering portions 33. As shown in FIGS. 12 and 13, the outer wall portions 35 are arranged adjacent to the stepped wall portion 32 and the fixing plates 36 are arranged adjacent to the outer wall portions 35.

Figure 15:
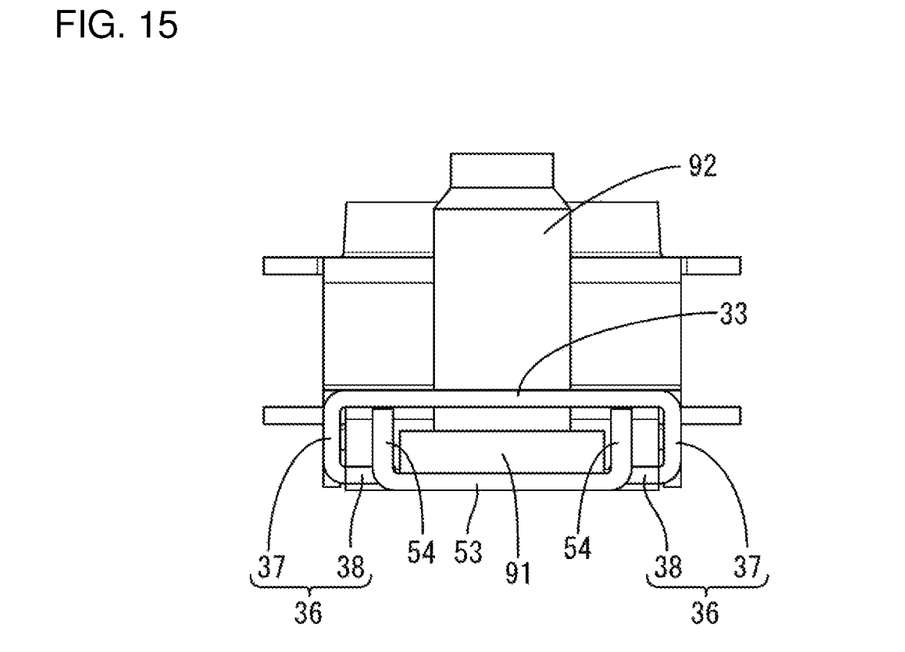
FIG. 15 is a back view of the terminal body of the embodiment.

Each outer wall portion 35 is a wall extending perpendicular to the bolt covering portion 33 from the side edge of the bolt covering portion 33. As shown in FIG. 15, each fixing plate 36 includes a fixing side plate 37 extending perpendicular to the bolt covering portion 33 from the side edge of the bolt covering portion 33 and a fixing piece 38 extending inward (toward the mating fixing side plate 37) from an extending end of the fixing side plate 37.

As shown in FIG. 12, the lower plate portion 40 includes a lower plate mounting portion 41, a lower plate mounting tube portion 43 and a lower plate connecting portion 51.

As shown in FIG. 10, the lower plate mounting portion 41 is a C-shaped plate-like part similarly to the upper plate mounting portion 21 and includes a lower plate mounting hole 42. The lower plate mounting hole 42 has an inner diameter slightly larger than the outer diameter of the battery post 100 in the free state where the battery terminal 1 is not mounted on the battery post 100.

As shown in FIG. 4, the lower plate mounting tube portion 43 is a C-shaped tubular part rising from the hole edge of the lower plate mounting hole 42.

The lower plate connecting portion 51 is a plate-like part extending from the lower plate mounting portion 41 and includes an inclined portion 52, a bolt receiving portion 53 and two inner wall portions 54.

As shown in FIG. 4, the inclined portion 52 is a plate-like part continuous from the lower plate mounting portion 41. The inclined portion 52 is gently inclined to be away from the upper plate portion 20 with distance from the lower plate mounting portion 41.

The bolt receiving portion 53 is a rectangular plate-like part extending from an extending end of the inclined portion 52 toward a side opposite to the lower plate mounting portion 41.

As shown in FIG. 15, each of the two inner wall portions 54 is arranged on each of two side edges (two end edges perpendicular to an end edge connected to the inclined portion 52) of the bolt receiving portion 53. Each inner wall portion 54 is a wall perpendicularly extending from the side edge of the bolt receiving portion 53. A distance between the two inner wall portions 54 is shorter than a distance between the two outer wall portions 35 of the upper plate portion 20 and between the two fixing side plates 37 of the upper plate portion 20.

Figure 5:
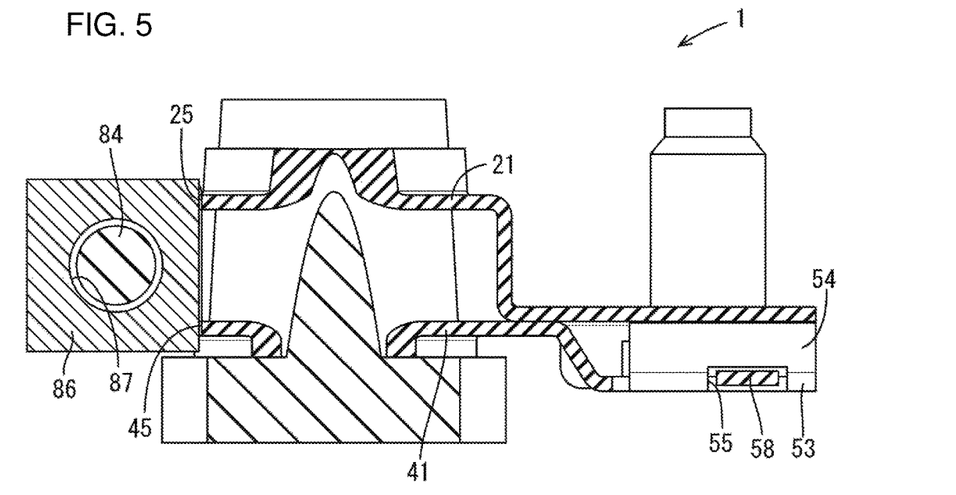
FIG. 5 is a section along C-C of FIG. 2.

The lower plate connecting portion 51 includes two fixing/receiving holes 55. As shown in FIG. 5, one of the two fixing/receiving holes 55 is a through hole arranged in a boundary part between the bolt receiving portion 53 and one of the two inner wall portions 54 and configured to receive one fixing piece 38, and the other is a through hole arranged in a boundary part between the bolt receiving portion 53 and the other of the two inner wall portions 54 and configured to receive the other fixing piece 38.

As shown in FIGS. 4 and 10, the upper plate portion 20 and the lower plate portion 40 are arranged to face at a distance from each other such that the positions of the cuts of the C shapes and the positions of the upper plate mounting hole 22 and the lower plate mounting hole 43 are aligned with the upper plate mounting tube portion 23 extending in a direction opposite to the lower plate portion 40 and the lower plate mounting tube portion 43 extending in a direction opposite to the upper plate portion 20. Further, as shown in FIG. 15, the bolt covering portion 33 and the bolt receiving portion 53 are arranged such that the outer wall portions 35 and the inner wall portions 54 extend toward each other and the two inner wall portions 54 are arranged between the two outer wall portions 35. The two fixing pieces 38 are respectively accommodated into the two fixing/receiving holes 55 to be fixed to each other.

The terminal connecting bolt 90 is held by the bolt covering portion 33 and the bolt receiving portion 53. The bolt covering portion 90 is a generally shaped bolt including a head portion 91 and the shaft portion 92. As shown in FIG. 15, a clearance corresponding to lengths of the inner wall portions 54 is present between the bolt covering portion 33 and the bolt receiving portion 53, and the head portion 91 of the terminal connecting bolt 90 is accommodated in this clearance. As shown in FIG. 4, the shaft portion 92 of the bolt covering portion 90 is inserted into the bolt insertion hole 34 to project outward. A wire can be connected to the terminal connecting bolt 90 via a wire-side terminal.

As shown in FIG. 10, each of the two fastening portions 60, 70 is a U-shaped plate-like part coupling the upper plate mounting portion 21 and the lower plate mounting portion 41. One of the two fastening portions 60, 70 is a first fastening portion 60 and includes, as shown in FIG. 13, an upper plate first fastening portion 61 (corresponding to a first rotation stopping portion), a lower plate first fastening portion 62 (corresponding to the first rotation stopping portion) and a first coupling portion 63 (corresponding to the first rotation stopping portion). The upper plate first fastening portion 61 and the lower plate first fastening portion 62 correspond to two vertical side parts of the U shape and the first coupling portion 63 corresponds to a horizontal side part of the U shape.

As shown in FIGS. 10 and 13, the upper plate fastening portion 61 is a rectangular plate-like part extending outward from one end part out of two end parts of the C-shaped upper plate mounting portion 21, and arranged on the same plane as the upper plate mounting portion 21. The lower plate fastening portion 62 is a rectangular plate-like part extending outward from one end part out of two end parts of the C-shape lower plate mounting portion 41, and arranged on the same plane as the lower plate mounting portion 41. The upper plate first fastening portion 61 and the lower plate first fastening portion 62 are arranged in parallel to face each other. The first coupling portion 63 is a rectangular plate-like part coupling an extending end (end edge opposite to the upper plate mounting portion 21) of the upper plate first fastening portion 61 and an extending end (end edge opposite to the lower plate mounting portion 41) of the lower plate first fastening portion 62, and arranged to be perpendicular to both the upper plate first fastening portion 61 and the lower plate first fastening portion 62.

The other of the two fastening portions 60, 70 is a second fastening portion 70 and includes, as shown in FIG. 12, an upper plate second fastening portion 71 (corresponding to the first rotation stopping portion), a lower plate second fastening portion 72 (corresponding to the first rotation stopping portion) and a second coupling portion 73 (corresponding to the first rotation stopping portion). The upper plate second fastening portion 71 and the lower plate second fastening portion 72 correspond to two vertical side parts of the U shape and the second coupling portion 73 corresponds to a horizontal side part of the U shape.

As shown in FIGS. 10 and 12, the upper plate fastening portion 71 is a rectangular plate-like part extending outward from the other end part out of the two end parts of the C-shaped upper plate mounting portion 21, and arranged on the same plane as the upper plate mounting portion 21. The lower plate fastening portion 72 is a rectangular plate-like part extending outward from the other end part out of the two end parts of the C-shaped lower plate mounting portion 41, and arranged on the same plane as the lower plate mounting portion 41. The upper plate second fastening portion 71 and the lower plate second fastening portion 72 are arranged in parallel to face each other. The second coupling portion 73 is a rectangular plate-like part coupling an extending end (end edge opposite to the upper plate mounting portion 21) of the upper plate second fastening portion 71 and an extending end (end edge opposite to the lower plate mounting portion 41) of the lower plate second fastening portion 72, and arranged to be perpendicular to both the upper plate second fastening portion 71 and the lower plate second fastening portion 72.

As shown in FIGS. 10 and 14, the first and second fastening portions 60, 70 are arranged in parallel with each other across a clearance. U-shaped inner spaces in the two fastening portions 60, 70 serve as bolt accommodating portions 65, 75 as shown in FIGS. 12 and 13. As shown in FIG. 14, an end edge of the first fastening portion 60 opposite to the second fastening portion 70 serves as a first restricting edge 64 and an end edge of the second fastening portion 70 opposite to the first fastening portion 60 serves as a second restricting edge 74. Further, as shown in FIGS. 12, 13 and 14, the upper plate mounting portion 21 includes an upper plate first stopping edge 24 (corresponding to a second rotation stopping portion) adjacent to and perpendicular to the first restricting edge 64 and an upper plate second stopping edge 25 (corresponding to a third rotation stopping portion) adjacent to and perpendicular to the second restricting edge 74. The lower plate mounting portion 41 includes a lower plate first stopping edge 44 (corresponding to the second rotation stopping portion) adjacent to and perpendicular to the first restricting edge 64 and a lower plate second stopping edge 45 (corresponding to the third rotation stopping portion) adjacent to and perpendicular to the second restricting edge 74.

As shown in FIG. 1, the fastening member 80 is composed of a fastening bolt 81, a washer 86 (corresponding to a sandwiching member) and a nut 85.

Figure 16:
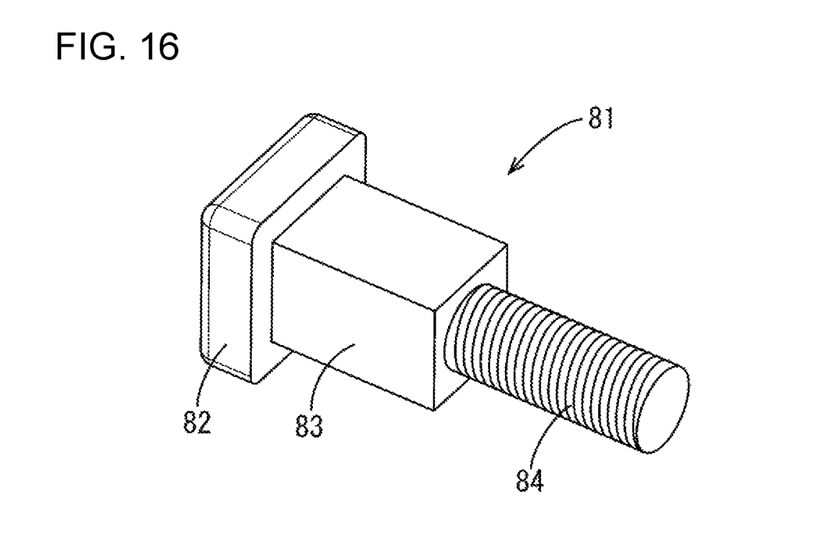
FIG. 16 is a perspective view of a fastening bolt of the embodiment.

As shown in FIG. 16, the fastening bolt 81 includes a head portion 82, a column portion 83 and a shaft portion 84. The head portion 82 is a thick square plate-like part. The column portion 83 is a rectangular column part extending perpendicularly from one surface of the head portion 82 and has four side surfaces. The shaft portion 84 is a cylindrical part extending toward a side opposite to the head portion 82 from an end surface of the column portion 83 opposite to the head portion 82 and thinner than the column portion 83, and includes an external thread on an outer peripheral surface.

As shown in FIG. 10, the nut 85 is a generally shaped hexagonal nut. As shown in FIG. 10, the washer 86 is a square plate-like part having substantially the same outer shape as the head portion 82 of the fastening bolt 81 and includes a bolt insertion hole 87. The bolt insertion hole 87 is a through hole having such a size that the shaft portion 84 of the fastening bolt 81 is insertable therethrough, but the column portion 83 is not insertable therethrough. The washer 86 is assembled between the column portion 83 and the nut 85 with the shaft portion 84 inserted through the bolt insertion hole 87.

Next, the procedure of mounting the battery terminal 1 configured as described above on the battery post 100 is described.

Figure 3:
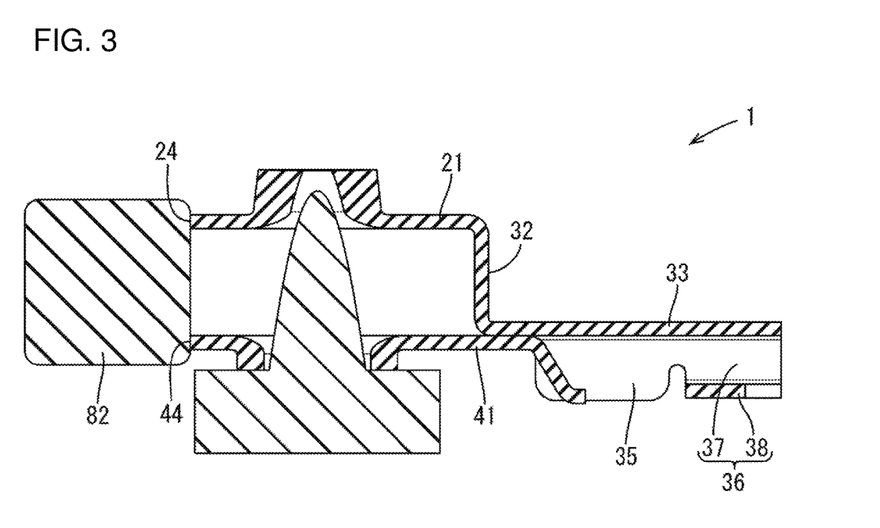
FIG. 3 is a section along A-A of FIG. 2.
Figure 6:
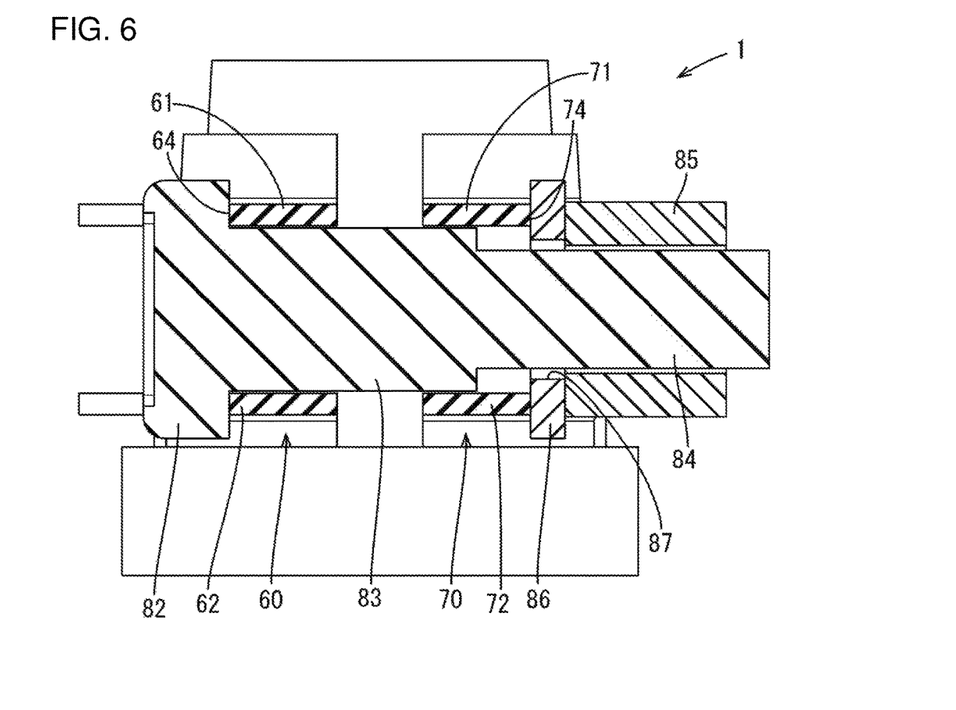
FIG. 6 is a section along D-D of FIG. 2.
Figure 7:
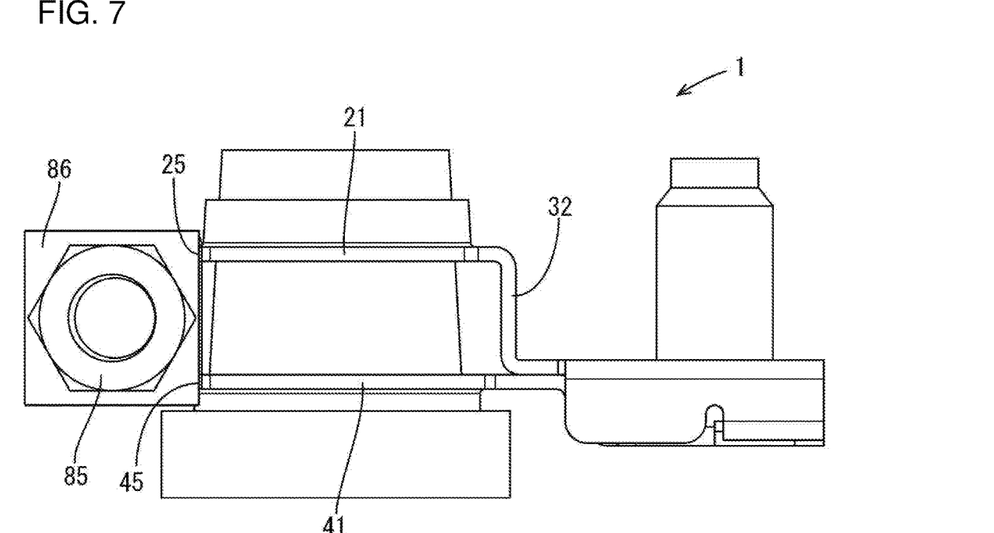
FIG. 7 is a right side view of the battery terminal of the embodiment.
Figure 8:
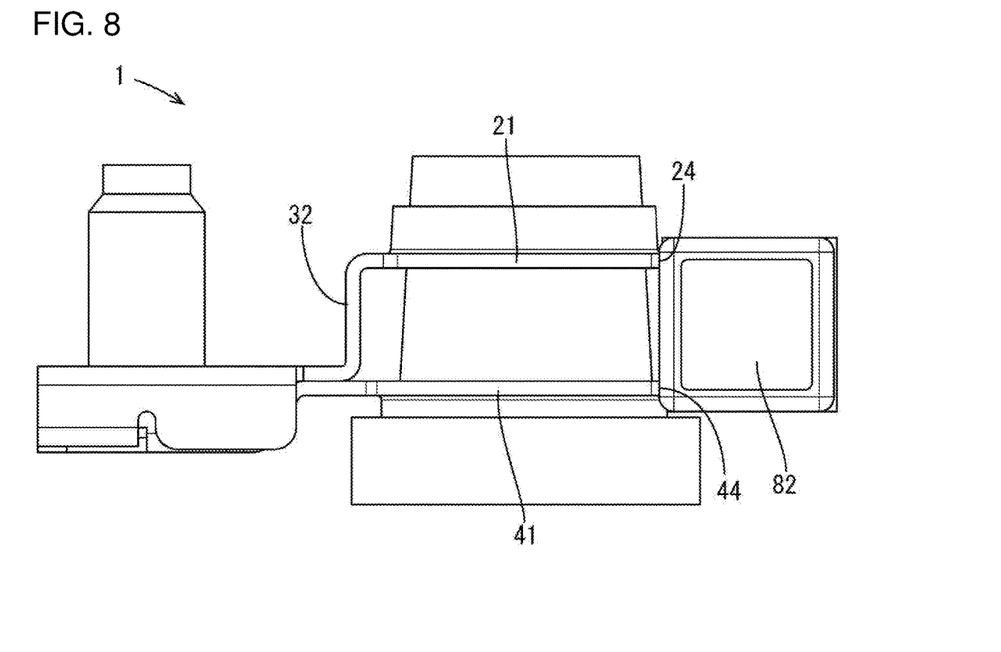
FIG. 8 is a left side view of the battery terminal of the embodiment.
Figure 9:
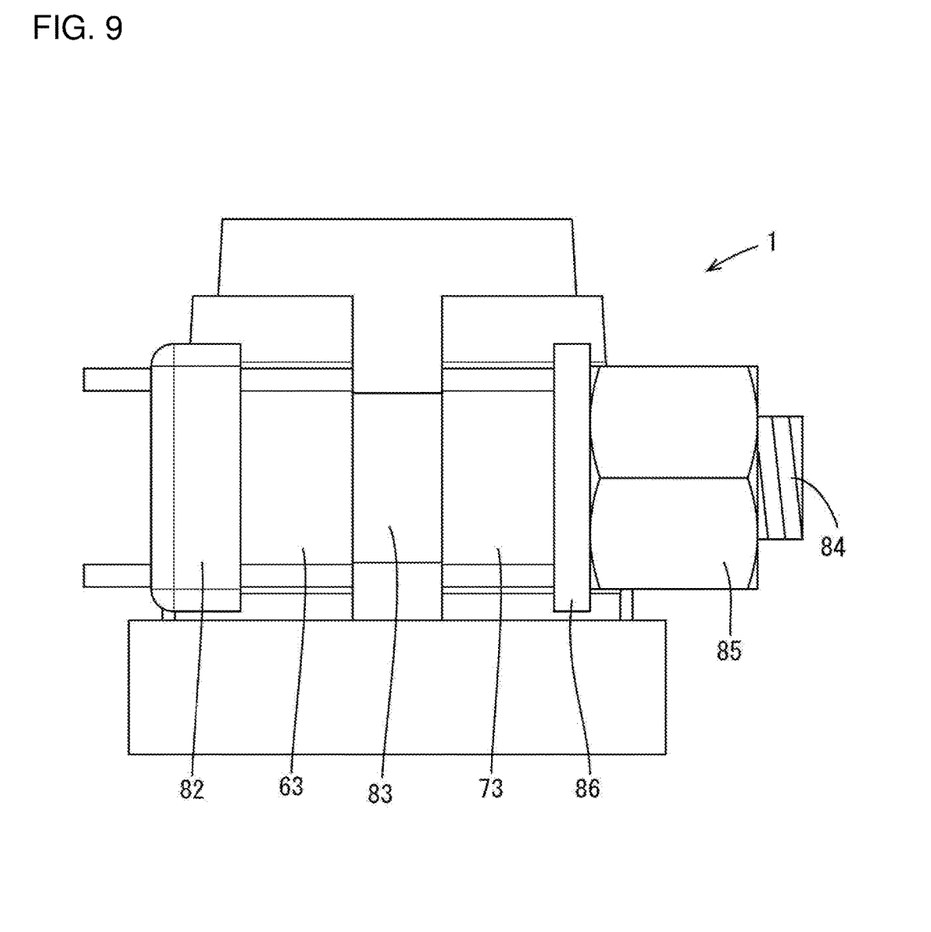
FIG. 9 is a front view of the battery terminal of the embodiment.

The battery post 100 is inserted through the upper plate mounting hole 22 and the lower plate mounting hole 42 of the terminal body 10. Subsequently, the column portion 83 of the fastening bolt 81 is inserted into the bolt accommodating portions 65, 75. A part of the column portion 83 adjacent to the head portion 82 is accommodated in the bolt accommodating portion 65 and a part thereof near the shaft portion 84 is accommodated in the bolt accommodating portion 75. As shown in FIGS. 4 and 6, one of the four side surfaces of the column portion 83 is in contact with the first and second coupling portions 63, 73, and one of other two surfaces perpendicular to the one surface is in contact with the upper plate first fastening portion 61 and the upper plate second fastening portion 71 and the other is in contact with the lower plate first fastening portion 62 and the lower plate second fastening portion 72. In this way, the rotation of the fastening bolt 81 is stopped: As shown in FIGS. 4 and 6, the head portion 82 is so sized as not to be inserted into the bolt accommodating portion 65 and is in contact with the first restricting edge 64. Further, one of four sides constituting the outer peripheral edge of the head portion 82 is in contact with the upper plate first stopping edge 24 and the lower plate first stopping edge 44 as shown in FIG. 3. In this way, the rotation of the fastening bolt 81 is stopped. As shown in FIG. 6, a part of the shaft portion 84 adjacent to the column portion 83 is accommodated in the bolt accommodating portion 75 and the remaining part projects outward from the second fastening portion 70.

Subsequently, the shaft portion 84 is inserted through the bolt insertion hole 87 of the washer 86. The washer 86 is so sized as not to be insertable into the bolt accommodating portion 75 and, as shown in FIG. 6, is in contact with the second restricting edge 74. Further, one of four sides constituting the outer peripheral edge of the washer 86 is in contact with the upper plate second stopping edge 25 and the lower plate second stopping edge 45 as shown in FIG. 5. In this way, the rotation of the washer 86 is stopped.

Subsequently, the nut 85 is screwed onto the shaft portion 84. As the nut 85 is tightened while being rotated, the washer 86 moves toward the head portion 82 by being pressed by the nut 85. Then, the first fastening portion 60 and the second fastening portion 70 are pressed closer to each other between the washer 86 and the head portion 82. Along with this, the upper plate mounting portion 21 and the lower plate mounting portion 41 are reduced in diameter and the inner peripheral surfaces of the upper plate mounting tube portion 23 and the lower plate mounting tube portion 43 are held in close contact with the battery post 100. In this way, the battery terminal 1 is mounted on the battery post 100 to conductively connect the battery post 100 and the battery terminal 1.

At this time, the fastening bolt 81 includes the column portion 83 and the shaft portion 84 is insertable through the bolt insertion hole 87 of the washer 86, but the column portion 83 is not insertable therethrough. Thus, when the washer 86 comes into contact with the column portion 83, the nut 85 cannot be tightened onto the fastening bolt 81 any further. Thus, by setting a length of the column portion 83 according to an appropriate tightening amount, it can be avoided that the nut 85 is excessively tightened and the terminal body 10 is excessively deformed.

Further, one of the four side surfaces of the column portion 83 is in contact with the first and second coupling portions 63, 73, and one of other two surfaces perpendicular to the one surface is in contact with the upper plate first fastening portion 61 and the upper plate second fastening portion 71 and the other is in contact with the lower plate first fastening portion 62 and the lower plate second fastening portion 72. Further, one of four sides constituting the outer peripheral edge of the head portion 82 is in contact with the upper plate first stopping edge 24 and the lower plate first stopping edge 44. In this way, it can be avoided that the fastening bolt 81 rotates by being dragged by the rotation of the nut 85, and the terminal body 81 can be assembled in a proper posture with the terminal body 10.

Furthermore, one of the four sides of the washer 86 is in contact with the upper plate second stopping edge 25 and the lower plate second stopping edge 45. In this way, it can be avoided that the washer 86 rotates by being dragged by the rotation of the nut 85, and the washer 86 can be assembled in a proper posture with the terminal body 10.

As described above, according to this embodiment, the battery terminal 1 is a member to be mounted on the battery post 100 provided on the battery and includes the terminal body 10 with the upper plate mounting portion 21, the lower plate mounting portion 41, the first fastening portion 60 and the second fastening portion 70, and the fastening member 80 to be assembled with this terminal body 10. The upper plate mounting portion 21 and the lower plate mounting portion 41 are C-shaped parts disposed to face each other and surround the battery post 100. The first fastening portion 60 couples one of the both end parts of the C-shaped upper plate mounting portion 21 and one of the both end parts of the C-shaped plate mounting portion 41 and includes the bolt accommodating portion 65. The second fastening portion 70 couples the other of the both end parts of the C-shaped upper plate mounting portion 21 and the other of the both end parts of the C-shaped lower plate mounting portion 41 and includes the bolt accommodating portion 75. The fastening member 80 is a member for pressing the first and second fastening portions 60, 70 in directions toward each other and deforming the upper plate mounting portion 21 and the lower plate mounting portion 41 to reduce the diameters thereof by being assembled with the first and second fastening portions 60, 70 and includes the fastening bolt 81, the nut 85 and the washer 86. The fastening bolt 81 includes the head portion 82, the column-shaped column portion 83 extending from the head portion 82 and to be accommodated into the bolt accommodating portions 65, 75 and the shaft portion 84 extending from the column portion 83, in the form of a cylinder thinner than the column portion 83 and having the external thread on the outer peripheral surface. The nut 85 is a member to be screwed onto the shaft portion 84. The washer 86 is a member including the bolt insertion hole 87 sized such that the shaft portion 84 is insertable therethrough, but the column portion 83 is not insertable therethrough, to be assembled between the column portion 83 and the nut 85 by inserting the shaft portion 84 through the bolt insertion hole 87 and configured to sandwich the first and second fastening portions 70, 60 between the washer 86 and the head portion 82.

According to the above configuration, the fastening bolt 81 includes the column portion 83 and the shaft portion 84 is insertable through the bolt insertion hole 87 of the washer 86, but the column portion 83 is not insertable therethrough. Thus, when the washer 86 comes into contact with the column portion 83, the nut 85 cannot be tightened onto the fastening bolt 81 any further. Thus, by setting the length of the column portion 83 according to the appropriate tightening amount, the tightening amount of the nut 85 can be appropriately managed and excessive deformation of the terminal body 10 can be avoided.

Further, the column portion 83 is in form of a polygonal column having a plurality of side surfaces, the first fastening portion 60 includes the first coupling portion 63, the upper plate first fastening portion 61 and the lower plate first fastening portion 62, and the second fastening portion 70 includes the second coupling portion 73, the upper plate second fastening portion 71 and the lower plate second fastening portion 72. One of the four side surfaces of the column portion 83 is in contact with the first and second coupling portions 63, 73, another surface is in contact with the upper plate first fastening portion 61 and the upper plate second fastening portion 71 and still another surface is in contact with the lower plate first fastening portion 62 and the lower plate second fastening portion 72. In this way, it can be avoided that the fastening bolt 81 rotates by being dragged by the rotation of the nut 85, and the terminal body 81 can be assembled in a proper posture with the terminal body 10.

Furthermore, the head portion 82 of the fastening bolt 81 has a square outer shape having a plurality of sides, and the upper plate mounting portion 21 includes the upper plate first stopping edge 24 for restricting the rotation of the head portion 82 by being held in contact with one of the four sides of the head portion 82. Further, the lower plate mounting portion 41 includes the lower plate first stopping edge 44 for restricting the rotation of the head portion 82 by being held in contact with one of the four sides of the head portion 82.

Also by this configuration, it can be avoided that the fastening bolt 81 rotates by being dragged by the rotation of the nut 85, and the fastening bolt 81 can be assembled in a proper posture with the terminal body 10.

In addition, the washer 86 has a square outer shape having a plurality of sides, and the upper plate mounting portion 21 includes the upper plate second stopping edge 25 for restricting the rotation of the head portion 82 by being held in contact with one of the four sides of the washer 86. Further, the lower plate mounting portion 41 includes the lower plate second stopping edge 45 for restricting the rotation of the head portion 82 by being held in contact with one of the four sides of the washer 86.

According to this configuration, it can be avoided that the washer 86 rotates by being dragged by the rotation of the nut 85, and the washer 86 can be assembled in a proper posture with the terminal body 10.

The invention is not limited to the above described and illustrated embodiment. For example, the following various modes are also included.

Although the column portion 83 of the fastening bolt 81 is in the form of a rectangular column in the above embodiment, the column portion 83 only has to be in the form of a polygonal column having a plurality of side surfaces and, for example, may be in the form of a hexagonal column.

Although the head portion 82 and the washer 86 of the fastening bolt 81 have a square shape in the above embodiment, the head portion 82 and the washer 86 only have to have a polygonal outer shape having a plurality of sides and, for example, may have a hexagonal shape.

LIST OF REFERENCE SIGNS

1 . . . battery terminal
10 . . . terminal body
21 . . . upper plate mounting portion
24 . . . upper plate first stopping edge (second rotation stopping portion)
25 . . . upper plate second stopping edge (third rotation stopping portion)
41 . . . lower plate mounting portion
44 . . . lower plate first stopping edge (second rotation stopping portion)
45 . . . lower plate second stopping edge (third rotation stopping portion)
60 . . . first fastening portion
61 . . . upper plate first fastening portion (first rotation stopping portion)
62 . . . lower plate first fastening portion (first rotation stopping portion)
63 . . . first coupling portion (first rotation stopping portion)
65, 75 . . . bolt accommodating portion
70 . . . second fastening portion
71 . . . upper plate second fastening portion (first rotation stopping portion)
72 . . . lower plate second fastening portion (first rotation stopping portion)
73 . . . second coupling portion (first rotation stopping portion)
80 . . . fastening member
81 . . . fastening bolt
82 . . . head portion
83 . . . column portion
84 . . . shaft portion
85 . . . nut
86 . . . washer (sandwiching member)
87 . . . bolt insertion hole
100 . . . battery post

What is claimed is:

1. A battery terminal to be mounted on a battery post provided on a battery, comprising:
    a terminal body with arcuate first mounting portion and second mounting portion arranged to face each other and to surround the battery post, a first fastening portion coupling one of both end parts of the arcuate first mounting portion and one of both end parts of the arcuate second mounting portion and including a bolt accommodating portion, and a second fastening portion coupling the other of the both end parts of the arcuate second mounting portion and the other of the both end parts of the arcuate second mounting portion and including a bolt accommodating portion; and
    a fastening member configured to press the first and second fastening portions in directions toward each other and to deform the first and second mounting portions to reduce diameters thereof by being assembled with the first and second fastening portions;
    the fastening member including:
    a fastening bolt having a head, a column extending from the head and to be accommodated into the bolt accommodating portions and a shaft extending from the column, the shaft being in the form of a cylinder thinner than the column and having an external thread on an outer peripheral surface;
    a nut to be screwed onto the shaft; and
    a sandwiching member having a polygonal outer shape with a plurality of sides, the sandwiching member further having a bolt insertion hole, the shaft being insertable through the bolt insertion hole, but the column being not insertable through the bolt insertion hole, and configured to sandwich the first and second fastening portions between the sandwiching member and the head by inserting the shaft through the bolt insertion hole and assembling the sandwiching member between the column and the nut, wherein:
    the second mounting portion includes a sandwiching member rotation stopping portion configured to restrict rotation of the sandwiching member by coming into contact with any one of the plurality of sides of the sandwiching member.

2. The battery terminal of claim 1, wherein:
    the column portion is in the form of a polygonal column having a plurality of side surfaces; and
    the first and second fastening portions further include a column rotation stopping portion configured to restrict the rotation of the column by coming into contact with any one of the plurality of side surfaces of the column.

3. A battery terminal to be mounted on a battery post provided on a battery, comprising:
    a terminal body with arcuate first and second mounting portions arranged to face each other and to surround the battery post, a first fastening portion coupling one of both end parts of the arcuate first mounting portion and one of both end parts of the arcuate second mounting portion and including a bolt accommodating portion, and a second fastening portion coupling the other of the both end parts of the arcuate second mounting portion and the other of the both end parts of the arcuate second mounting portion and including a bolt accommodating portion; and
    a fastening member configured to press the first and second fastening portions in directions toward each other and to deform the first and second mounting portions to reduce diameters thereof by being assembled with the first and second fastening portions;

the fastening member including:

a fastening bolt having a head, the head having a polygonal outer shape with a plurality of sides, a polygonal column extending from the head and having a plurality of side surfaces, the polygonal column to be accommodated into the bolt accommodating portions and a shaft extending from the polygonal column, the shaft being in the form of a cylinder thinner than the polygonal column and having an external thread on an outer peripheral surface;

a nut to be screwed onto the shaft portion; and a sandwiching member having a bolt insertion hole, the shaft being insertable through the bolt insertion hole, but the polygonal column being not insertable through the bolt insertion hole, and configured to sandwich the first and second fastening portions between the sandwiching member and the head by inserting the shaft through the bolt insertion hole and assembling the sandwiching member between the column portion and the nut, wherein:

the first and second fastening portions include a column first rotation stopping portion configured to restrict the rotation of the polygonal column by coming into contact with any one of the side surfaces of the polygonal column; and the first mounting portion includes a head rotation stopping portion configured to restrict the rotation of the head by coming into contact with any one of the plurality of sides of the head.

4. The battery terminal of claim 3, wherein:

the sandwiching member has a polygonal outer shape having a plurality of sides; and the second mounting portion includes a sandwiching member rotation stopping portion configured to restrict the rotation of the sandwiching member by coming into contact with any one of the plurality of sides of the sandwiching member.

5. A battery terminal to be mounted on a battery post provided on a battery, comprising:

a terminal body with arcuate first and second mounting portions arranged to face each other and to surround the battery post, a first fastening portion coupling one of both end parts of the arcuate first mounting portion and one of both end parts of the arcuate second mounting portion and including a bolt accommodating portion, and a second fastening portion coupling the other of the both end parts of the arcuate second mounting portion and the other of the both end parts of the arcuate second mounting portion and including a bolt accommodating portion; and a fastening member configured to press the first and second fastening portions in directions toward each other and to deform the first and second mounting portions to reduce diameters thereof by being assembled with the first and second fastening portions;

the fastening member including:

a fastening bolt having a head, the head having a polygonal outer shape with a plurality of sides, a column extending from the head and to be accommodated into the bolt accommodating portions and a shaft extending from the column, the shaft being in the form of a cylinder thinner than the column and having an external thread on an outer peripheral surface;

a nut to be screwed onto the shaft portion; and a sandwiching member having a bolt insertion hole, the shaft being insertable through the bolt insertion hole, but the column being not insertable through the bolt insertion hole, and configured to sandwich the first and second fastening portions between the sandwiching member and the head by inserting the shaft through the bolt insertion hole and assembling the sandwiching member between the column and the nut; and wherein:

the first mounting portion includes a head rotation stopping portion configured to restrict the rotation of the head by coming into contact with any one of the plurality of sides of the head.

6. The battery terminal of claim 5, wherein:

the sandwiching member has a polygonal outer shape having a plurality of sides; and the second mounting portion includes a sandwiching member rotation stopping portion configured to restrict the rotation of the sandwiching member by coming into contact with any one of the plurality of sides of the sandwiching member.

* * * * *